United States Patent
Plummer

[11] 3,797,922
[45] Mar. 19, 1974

[54] AZYGOUS OPHTHALMIC LENS AND SPECTACLES FOR CORRECTING PRESBYOPIA

[75] Inventor: William T. Plummer, Concord, Mass.

[73] Assignee: Polaroid Corporation, Cambridge, Mass.

[22] Filed: May 10, 1973

[21] Appl. No.: 358,846

Related U.S. Application Data

[63] Continuation of Ser. No. 197,852, Nov. 11, 1971, abandoned.

[52] U.S. Cl. .................................. 351/169, 350/189
[51] Int. Cl. ............................................... G02c 7/06
[58] Field of Search ..................... 351/169; 350/189

[56] References Cited
UNITED STATES PATENTS

| | | | |
|---|---|---|---|
| 943,449 | 12/1909 | Orford | 351/169 |
| 1,143,316 | 6/1915 | Poullain et al. | 351/169 X |
| 2,001,952 | 5/1935 | Birchall | 351/169 |
| 3,507,565 | 4/1970 | Alvarez et al. | 351/169 X |
| 2,475,275 | 7/1949 | Birchall | 351/169 X |
| 2,878,721 | 3/1959 | Kanolt | 351/169 |

*Primary Examiner*—David H. Rubin

[57] ABSTRACT

A concept for a polyfocal ophthalmic lens is described. The polyfocal ophthalmic lens has at least one analytic refracting surface whose power changes uniformly from its top to its bottom. Vision-correcting eyeglasses incorporating polyfocal ophthalmic lenses offer a wearer several lens powers to choose among for different seeing tasks. Polyfocal ophthalmic lenses eliminate the distracting refractive discontinuity present in ordinary bi-focal ophthalmic lenses. In one embodiment of the polyfocal ophthalmic lens, the net refracting power changes so the upper portion of the ophthalmic lens is suitable for viewing distant objects, while the lower portion is suitable for reading and the central portion is suitable for intermediate seeing tasks.

1 Claim, 4 Drawing Figures

PATENTED MAR 19 1974　3,797,922

INVENTOR.
WILLIAM T. PLUMMER
BY Brown and Mikulka
and
Frederick H. Brustman
ATTORNEYS

PATENTED MAR 19 1974

INVENTOR.
WILLIAM T. PLUMMER

BY Brown and Mikulka
and
Frederick H. Brustman
ATTORNEYS

3,797,922

AZYGOUS OPHTHALMIC LENS AND SPECTACLES FOR CORRECTING PRESBYOPIA

CROSS REFERENCE TO A RELATED APPLICATION

This application is a continuation of U. S. Pat. application Ser. No. 197,852, filed Nov. 11, 1971, and now abandoned.

BACKGROUND OF THE DISCLOSURE

Many people experience difficulty in focusing or accommodating their eyes to view very near or very far objects. This difficulty of accommodation, presbyopia, is associated with advancing years and in people more than 50 years old commonly requires correction, e.g., multiple pairs of eyeglasses or multi-focal (bifocal or trifocal) lenses.

When some degree of accommodation remains in the eye, bifocal lenses are adequate. One portion of each bifocal lens incorporates an optometric prescription to correct the wearer's vision for seeing distant objects, i.e., to provide clear vision of objects 6 meters and more from the eye. Another portion of each bifocal lens, usually in the lower half, incorporates an optometric prescription to correct the wearer's vision for reading or seeing objects at an ordinary working distance, i.e., to provide clear vision of objects about forty centimeters from the eye.

In severe instances of presbyopia, common in people over 60 years of age, the eye completely loses its ability to accommodate and trifocal lenses are necessary. Trifocal lenses incorporate a third portion to correct the wearer's vision for objects at intermediate distances, i.e., to provide clear vision of objects one to two meters from the eye. The portion for correcting intermediate vision is generally located between the portion for correcting distant vision and reading vision so the user can select the correction appropriate for his immediate visual needs by shifting his gaze, up or down, through different portions of his multi-focal lenses.

The convenience of bifocal or trifocal spectacles over normal spectacles for persons afflicted with presbyopia is clear. However, they have drawbacks. At the interface between adjacent portions is a refractive discontinuity through which the wearer cannot see an undistorted image. He must peer over or under the interface. The discontinuity exists in multi-focal lenses made by mechanically joining segments of different lenses together and also in lenses made by fusing or cementing inserts of one refractive index onto a lens of different refractive index. Another drawback of conventional multi-focal lenses is that they provide only a small number, usually two, sometimes three, of discrete corrections due to the increasing complexity of manufacture, when in many instances one might prefer a greater number of corrections. To overcome these deficiencies, U.S. Pat. Nos. 3,305,294 and 3,507,565 suggest a type of variable focus lens possibly suitable for ophthalmic use. The variable focus lens proposed in those patents requires a pair of coextensive components held together, before the wearer's eye, in a mechanical frame permitting one component to rotate or slide with respect to the other component. The arrangement suffers from certain disadvantages. Dirt may accumulate in the space between two components, and a wearer must manually adjust the variable focus lens to his immediate visual needs every time they change by rotating or sliding one of the components until he feels satisfied with the adjustment.

SUMMARY AND OBJECTS OF THE INVENTION

The invention comprises an azygous ophthalmic lens (i.e., not one of a doublet or other axial set of lenses) having an analytic surface contour such that the refractive power of the surfaces changes continuously from top to bottom. The polynomial $$1/2R(x^2 + y^2) + Ay + By^3 + Cyx^2 = z$$

describes the general three-dimensional form of the analytic surface where: z is the height of the surface from a reference plane transverse to the nominal axis of the azygous lens; x and y are horizontal and vertical coordinates, respectively; R is the nominal radius of the surface; A, B, and C are constants chosen so, in the general case, the second derivative of z with respect to x equals the second derivative of z with respect to y, and so the change in analytic surface from top to bottom introduces the desired accommodation power, A is selected to remove the net slope of the analytic surface. Azygous ophthalmic lenses according to the present concept are referred to as polyfocal, distinguishing them from prior art bifocal and trifocal lenses, because of the continuum of different refractive powers available in the vertical direction.

The polyfocal lens is curved about the eye in the manner of prior art ophthalmic lenses to minimize distortion. A wearer of spectacles fitted with a pair of polyfocal lenses according to the present concept merely rotates his eyes or tilts his head up or down to look through the portion of the polyfocal lens suited to his immediate visual requirement. Typically, a polyfocal lens has a distance vision correction at the top and changes uniformly, increasing in power, towards the bottom where the reading correction is situated.

A wearer of polyfocal spectacles will not experience any discomfort due to the change of power over the surface because the change is gradual and over a five millimeter distance (the diameter of the pupil) it is negligible for visual optics.

The second surface of a polyfocal lens can be individually shaped in the usual manner to provide a net lens power to correct hypermetropia, myopia, astigmia, or other visual defects, as required to fill an optometric prescription for a specific spectacle wearer.

Accordingly, an object of the present invention is a simple ophthalmic lens with a continuum of different vision-correcting powers.

Another object of the present invention is a monolithic ophthalmic lens free of distontinuities between portions of different vision-correcting power.

Yet another object of the present invention is an azygous ophthalmic lens having vision-correcting power that varies continuously from the top to the bottom of the lens.

Other objects of the invention will in part be obvious and will in part appear hereinafter.

DESCRIPTION OF THE DRAWINGS

For a fuller understanding of the nature and objects of the invention, reference should be had to the following detailed description taken in connection with the accompanying drawings, wherein.

DESCRIPTION OF THE PREFERRED EMBODIMENT

Figure 1:
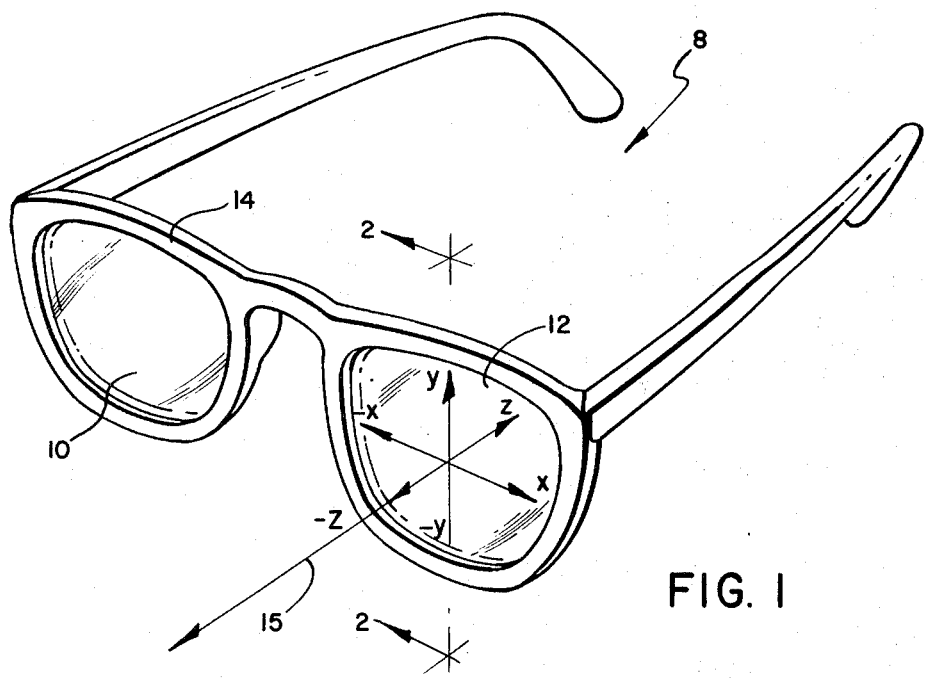
FIG. 1 illustrates a spectacle frame with a pair of polyfocal ophthalmic lenses.

Reference should be had to FIG. 1 showing a pair of spectacles comprising two azygous polyfocal ophthalmic lenses 10 and 12 retained in a frame 14. For convenience in describing the novel concept disclosed herein, the polynomial equations set forth below describing the surfaces of the polyfocal ophthalmic lenses 10 and 12 will be based in the three axis coordinate system illustrated in FIG. 1. In that coordinate system, the axis z extends in the direction of the nominal optic axis 15 of the ophthalmic lens 12 that, but for the concept taught herein, would nominally be its axis of rotational symmetry; the x axis and the y axis are orthogonal to the z axis and to each other, the y axis is vertical.

Figure 2:
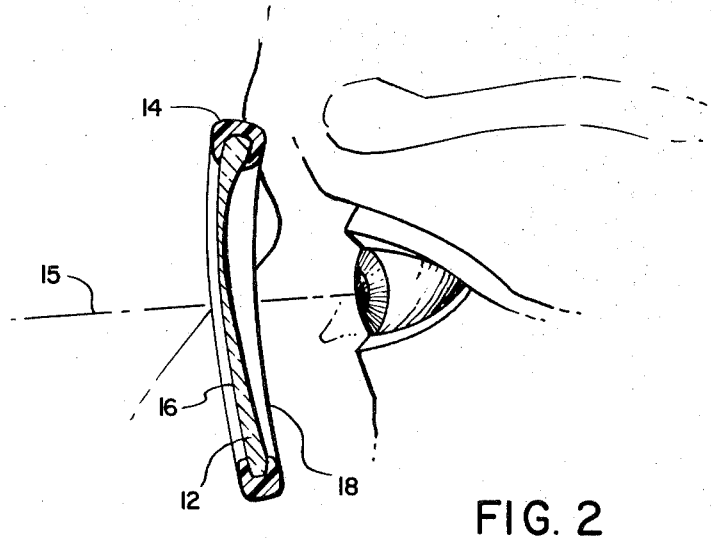
FIG. 2 illustrates a cross-section through the spectacles of FIG. 1 as worn by an individual.

The feature of the azygous polyfocal ophthalmic lenses 10 and 12 which corrects a wearer's vision for presbyopia more clearly reveals itself in FIG. 2. The cross-section through the polyfocal lens 12 discloses a front refracting surface 16 having a conventional spherical contour; however, the cross-section discloses the polyfocal lens 12 of the preferred embodiment having a rear refracting surface 18 with a novel non-spherical contour of decreasing curvature toward the lowest portion of the polyfocal lens 12 (shown greatly exaggerated in FIG. 2). The non-spherical rear surface 18 is also referred to herein more generally as the analytic surface because its precise contour results from an analysis of visual deficiencies and means for optimally correcting them. It will become clear that the present concept can be applied to the correction of complex visual defects other than presbyopia by appropriate changes in the polynomial set forth below.

The rear surface 18 has a nominal six diopter negative power (the refractive index minus one times the curvature of the surface) at the optic axis 15, (the center of the lens 12), causing rear surface 18 to curve about the eye as shown. The power increases (curvature decreases) uniformly toward the bottom of the rear surface 18 being seven diopters at a point one centimeter below the optic axis 15, and the power decreases (curvature increases) uniformly toward the top of the rear surface 18 being only five diopters at a point 1 centimeter above the optic axis 15. The power of the rear surface continues to change uniformly at still greater distances from the optic axis 15. The front surface 16 has a nominal six diopter positive power, but in the case of the front surface 16, the six diopter power remains constant across the surface from top to bottom and side to side.

It will now be understood that the net correcting power imparted by the polyfocal lens 12 to the eye equals the algebraic sum of the powers of the front surface 16 and the rear surface 18 along the line of sight assumed by the eye. That power (sum) is zero along a line of sight coaxial with the optic axis 15, but the power along a line of sight one centimeter above the optic axis 15 is minus one diopter, and the power along a line of sight 1 centimeter below the optic axis 15 is plus one diopter. Thus, the power of the polyfocal lens 12 changes uniformly from top to bottom without the refractive power discontinuities associated with bifocal and trifocal lenses.

A wearer suffering from presbyopia peers through the upper part of the polyfocal lens 12 using its negative power to refocus (bring close) distant objects within his limited range of accommodation. The wearer peers through the center of the polyfocal lens, along the optic axis 15, to see objects present within his limited range of accommodation, and he peers through the lower part of the polyfocal lens 12 using its positive power to refocus (move back) print and close objects within his limited range of accommodation. The reader will now understand that the exact line of sight through the polyfocal lens 12 chosen by the wearer will depend on the amount of correction he requires to comfortably perform his immediate visual task. The power distribution chosen establishes a relation between the line of sight and the net power through the lens allowing a wearer to select a specific corrective power by a subconscious eye rotation gesture.

In ordinary light the pupil of the eye has a diameter between 3 and 4 millimeters, and in bright light it has a diameter of only 2 millimeters. Thus, one can appreciate that the variation in power over the immediately employed aperture of the polyfocal lens is quite small, for the present example only plus or minus two-tenths diopter. A wearer of spectacles fitted with a pair of polyfocal lenses 12 can comfortably ignore the transpupillary variation.

The general equation describing the (analytic) rear refracting surface 18 is:

$$z = 1/2R(x^2 + y^2) + Ay + By^3 + Cyx^2$$

wherein $x$, $y$, and $z$ are coordinate directions described above; R is the nominal radius of the surface; A, B, and C are constants determined, as explained below, according to the exact analytic surface contour desired for the rear surface 18 of the polyfocal lens 12.

The first term, $1/2R(x^2 + y^2)$, mathematically defines the basic contour of the rear surface 18. While the term is actually parabolic, its approximation to a sphere is quite good and one can safely ignore the difference, in the present example it is about nine wavelengths of light at a distance of two centimeters from the optic axis 15. The parabolic approximation to a sphere simplifies the required mathematics. The terms $By^3$ and $Cyx^2$ describe the modification of the nominal contour $[1/2R(x^2 + y^2)]$ of the rear surface 18 to impart the desired changes for correcting presbyopia. The single term $Ay$ represents a linear change in the height z from the top to the bottom to overcome the ancillary prismatic increase in the thickness of the polyfocal lens 12 introduced by the term $By^3$.

A useful condition to set for the analytic contour of the rear surface 18 is that its curvature at any point on the surface should generally be the same in the x and y directions. To determine the value of the constants B and C, for which this condition is true, the second partial derivative of z with respect to y, $(\delta^2 z/\delta y^2 = 2/2R + 6By)$, is set equal to the second partial derivative of z with respect to x, $(\delta^2 z/\delta^2 = 2/2R + C2y)$, yielding $C = 3B$. These second partial derivatives are indicative of the curvature of the (analytic) rear surface 18 in their respective directions. The value of the constant A for the prismatic term Ay is obtained by setting equal to zero the difference between the values of $z$ for the maximum value of $y$ and for the minimum value of $y$. For the case of a circular lens blank of diameter $2h$, the maximum and minimum values of $y$ are $h$ and $-h$, respectively, and $A = -Bh^2$.

The equation describing the contour of the (analytic) rear surface 18 is:

$$z = 1/2R(x^2 + y^2) - Bh^2y + By^3 + 3Byx^2.$$

For glass with a nominal refractive index $(n)$ of 1.52 (typical of ophthalmic glass), $R$ has a value of 0.087 meters for the minus six diopter power at the optic axis 15. The value of B can be determined from the previously stated condition that the (analytic) rear surface 18 has a power of minus five diopters at a height of minus 1 centimeter ($y = -0.01$ meter) by solving $(\delta^2z/\delta y^2)n - 1 = 5$, when $y = -0.01$ meters, yielding $B = 31.7$. For a common eyeglass blank with a diameter of four centimeters, $h = 0.02$ meters. The equation describing the surface contour of the present example is:

$$z = 5.76(x^2 + y^2) - 0.0128y + 32y^3 + 96yx^2$$

where $x$, $y$, and $z$ are in meters.

Figure 3:
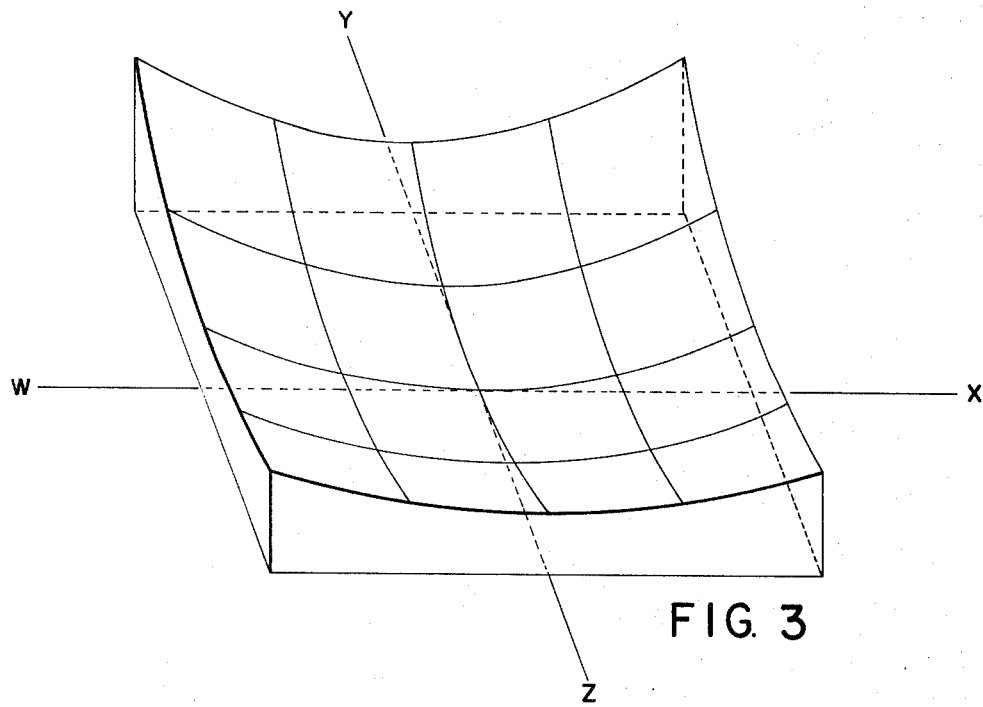
FIG. 3 illustrates an isometric view of an analytic ophthalmic lens surface for correcting presbyopia.
Figure 4:
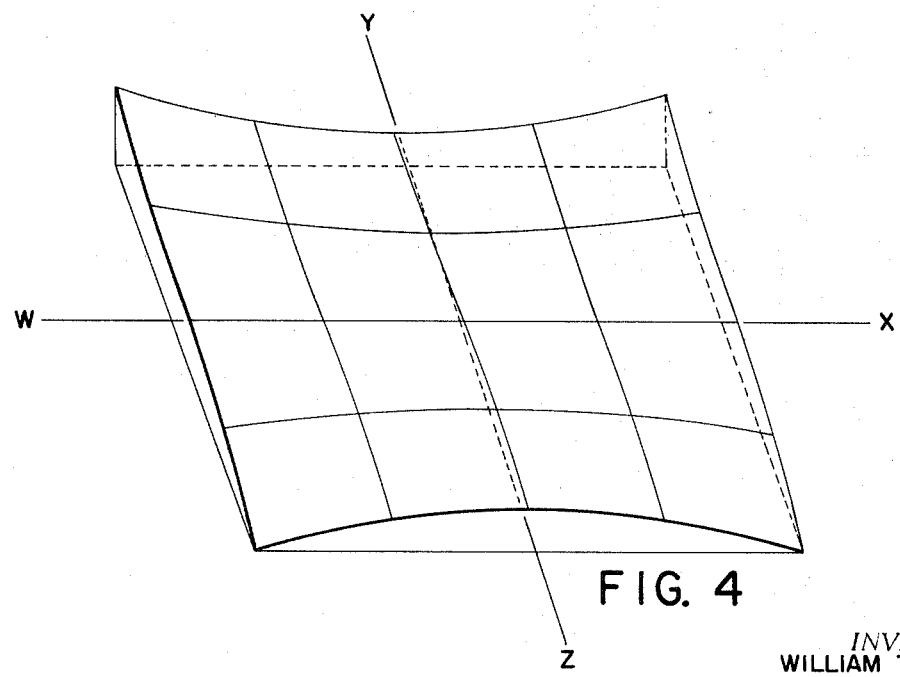
FIG. 4 illustrates an isometric view of the presbyopia correcting power of the surface shown in FIG. 3.

In FIG. 3, the analytic surface contour defined by the preceding equation and the constants is shown as an isometric drawing. The thickness ($z$ direction) is exaggerated by a factor of two times. One can see the lower portion curves less sharply then the upper portion and, consequently, it has more refractive power (less negative power). In FIG. 4, the contribution of the analytic terms alone, $-Bh^2y + By^3 + 3Byx^2$, is shown in an isometric drawing with the thickness exaggerated by a factor of four times.

While the preceding example described a polyfocal ophthalmic lens suited for correcting presbyopia only, it will now be understood that the concept disclosed herein is also applicable for correcting presbyopia when present in combination with other visual defects such as myopia, hyperopia, and astigmia. Shaping the front refracting surface 16, using standard methods for generating spherical and toroidal surfaces, provides the net refracting power required of the lens 12 without departing from the concept of the present invention. In addition, using the present concepts, but modifying the polynomial expression appropriately, one can develop refracting surfaces to correct eye muscle imbalances and even correct far more complicated visual defects, e.g., deformed retinas, by adding higher order terms.

In practice, polyfocal ophthalmic lenses according to the concepts disclosed herein would be manufactured with only a small variety of analytic surface contours each chosen to correct a different amount of presbyopia. To fill a specific ophthalmic prescription, an optician could select a polyfocal ophthalmic lens blank, previously manufactured according to the teachings herein, with the degree of correction required to compensate for the patient's presbyopia, and he would polish the non-analytic surface by standard methods to change the net power of the lens to correct ametropia and astigmia as required to fill the prescription.

One method for producing polyfocal ophthalmic lens blanks contemplates generating a convex mold insert with the inverse of a preselected analytic surface contour and also generating a concave mold insert with a preselected spherical or toroidal contour. The mold inserts, placed in a suitable molding machine, form a cavity with the desired lens blank shape. Glass or a synthetic thermoplastic, e.g., a polycarbonate, or another optical material is injected or pressed in the cavity to form the desired polyfocal lens blank. Polyfocal lens blanks with a variety of net ametropia corrections can be made by replacing only the spherically or toroidally shaped mold insert.

It is within the scope of the present invention to add more terms to the polynomial expression set forth above for such purposes as reducing the change in power toward the top and bottom of the polyfocal lens and/or to incorporate into the polyfocal lens a non-constant power gradient. While the polyfocal lens is described herein with the analytic surface contour on the rear of the lens, one can now understand that it can be located on the front of the lens as well.

It can be readily understood that many variations and modifications of the present invention are possible in light of the aforementioned teachings, and it will be apparent to those skilled in the art that various changes in form and arrangement may be made to suit requirements without departing from the spirit and scope of the invention. It is, therefore, to be understood that within the scope of the appended claims, the instant invention may be practiced in a manner than otherwise specifically described herein.

I claim:

1. A method for correcting presbyopia, including the steps of:

positioning an azygous polyfocal ophthalmic lens before a presbyopic eye, said azygous polyfocal ophthalmic lens having a constant refractive index and a front and a rear refracting surface, at least one of said refracting surfaces being non-rotational with a contour described by a polynomial expression comprising the terms:

$$1/2R(x^2 + y^2) + Ay + By^3 + Cyx^2 = z;$$

$z$ is the direction of the optic axis, $x$ and $y$ are the horizontal and vertical directions, respectively, R represents the nominal radius of the base curvature of said non-rotational refracting surface, and A, B, and C are constants selected so that:

$$\delta^2z/\delta x^2 = \delta^2z/\delta y^2;$$

viewing objects at a certain distance from said eye through one portion of said lens; and
viewing objects at a different distance from said eye through a different portion of said lens.

* * * * *